United States Patent
Elumalai et al.

(10) Patent No.: US 10,444,724 B2
(45) Date of Patent: Oct. 15, 2019

(54) INTERFACE METHOD AND APPARATUS

(71) Applicant: General Electric Company, Schenectady, NY (US)

(72) Inventors: Chandran Elumalai, Foxboro, MA (US); Robert Molden, Foxboro, MA (US); Chandra Sunkara, Foxboro, MA (US); James Blanchette, Foxboro, MA (US); Prasad Pai, Foxboro, MA (US)

(73) Assignee: General Electric Company, Schenectady, NY (US)

( * ) Notice: Subject to any disclaimer, the term of this patent is extended or adjusted under 35 U.S.C. 154(b) by 232 days.

(21) Appl. No.: 15/388,052

(22) Filed: Dec. 22, 2016

(65) Prior Publication Data

US 2017/0364320 A1    Dec. 21, 2017

(30) Foreign Application Priority Data

Jun. 20, 2016 (IN) .............................. 201641020997

(51) Int. Cl.
  *G06F 3/14* (2006.01)
  *G05B 19/05* (2006.01)
  *G05B 19/042* (2006.01)

(52) U.S. Cl.
  CPC ....... *G05B 19/054* (2013.01); *G05B 19/0423* (2013.01)

(58) Field of Classification Search
  CPC .................................... G06F 3/14; G06F 3/17
  USPC ............. 715/771; 345/157; 700/282, 17, 83
  See application file for complete search history.

(56) References Cited

U.S. PATENT DOCUMENTS

| | | | |
|---|---|---|---|
| 6,643,555 B1 * | 11/2003 | Eller | G05B 19/0426 700/17 |
| 6,799,080 B1 | 9/2004 | Hylden | |
| 7,092,771 B2 | 8/2006 | Retlich | |
| 7,551,072 B2 | 6/2009 | Tambascio | |
| 7,590,970 B2 | 9/2009 | Bromley | |
| 8,659,415 B2 | 2/2014 | Nagathil | |
| 8,798,775 B2 | 8/2014 | Plache | |
| 2004/0017355 A1 * | 1/2004 | Shim | G06F 3/0338 345/157 |
| 2007/0276514 A1 | 11/2007 | Martinez | |
| 2010/0198372 A1 | 8/2010 | Mehta | |

(Continued)

OTHER PUBLICATIONS

Ahmad, B., et al., "Automatic Generation of Human Machine Interface Screens from Component-Based Reconfigurable Virtual Manufacturing Cell." Industrial Electronics Society, IECON 2013-39th Annual Conference of the IEEE, Nov. 2013, pp. 7428-7433.

(Continued)

*Primary Examiner* — Ruay Ho
(74) *Attorney, Agent, or Firm* — Fitch Even Tabin & Flannery LLP

(57) ABSTRACT

A model that is stored in a memory is accessed. The model describes a visualization of information related to the operation of one or more industrial control machines or systems. Display information is received from the one or more industrial machines or systems. Context information is received from one or more sensors, or from user input. A display screen is graphically rendered at a graphical display unit to the one or more users. The content of the display screen is based upon the model, the display information, and the context.

8 Claims, 15 Drawing Sheets

(56) References Cited

U.S. PATENT DOCUMENTS

| | | |
|---|---|---|
| 2011/0001812 A1 | 1/2011 | Kang |
| 2015/0100893 A1 | 4/2015 | Cronin |
| 2016/0116951 A1* | 4/2016 | Andrews ............ H05K 7/20827 |
| | | 700/282 |
| 2017/0205811 A1* | 7/2017 | Grgic ............... G05B 19/41835 |

OTHER PUBLICATIONS

Ahmed, M.M., et al., "Supervisory Control and Data Acquisition System (SCADA) Based Customized Remote Terminal Unit (RTU) for Distribution Automation System." Power and Energy Conference, 2008. IEEE, pp. 1655-1660.

\* cited by examiner

| | | | |
|---|---|---|---|
| 302 — PropertyDefinition | DisplacementPumpShape | ControlMode | Discrete |
| 304 — PropertyDefinition | DisplacementPumpShape | OperationMode | Discrete |
| 306 — PropertyDefinition | DisplacementPumpShape | Speed | Analog |
| 308 — PropertyDefinition | DisplacementPumpShape | Manufacturer | ASCII |
| 310 — PropertyDefinition | DisplacementPumpShape | Total Runtime | Analog |
| 312 — PropertyDefinition | DisplacementPumpShape | GallonsPerMinute | ASCII |
| 314 — PropertyDefinition | DisplacementPumpShape | HorsePower | ASCII |

| | | | |
|---|---|---|---|
| 302 — PropertyDefinition | DisplacementPumpShape | ControlMode | Discrete |
| 304 — PropertyDefinition | DisplacementPumpShape | OperationMode | Discrete |
| 306 — PropertyDefinition | DisplacementPumpShape | Speed | Analog |
| 308 — PropertyDefinition | DisplacementPumpShape | Manufacturer | ASCII |
| 310 — PropertyDefinition | DisplacementPumpShape | Total Runtime | Analog |
| 312 — PropertyDefinition | DisplacementPumpShape | GallonsPerMinute | ASCII |
| 314 — PropertyDefinition | DisplacementPumpShape | HorsePower | ASCII |

300, 316, 318, 320 — Dial gauge

FIG. 5

INTERFACE METHOD AND APPARATUS

CROSS REFERENCE TO RELATED APPLICATION

This application claims priority from India Application Number IN 201641020997, filed Jun. 20, 2016, which is hereby incorporated by reference.

Application entitled "Interface Apparatus and Method for Alarms" naming as inventors Nagesh L. Kurella, Adhik Banerjee, Ayush Srivastava, Siva S. Gundeboina, Venkata Ramana Vakulabharanamand, and Joseph Kenny, is being filed on the same day as the present application and is incorporated herein by reference in its entirety.

BACKGROUND

Technical Field

The subject matter disclosed herein generally relates to presenting information to a user. More specifically, the subject matter relates to dynamically presenting information associated with industrial machines to users on human machine interfaces (HMIs).

Brief Description of the Related Art

In industrial operations, industrial machines and systems are monitored to ensure proper operation and/or detect anomalies which may arise. Users want to monitor these systems and use human machine interfaces (HMIs) to do so. In one example, an HMI uses a screen on a computer along with the software to display various types of information on the screen. The HMI may also include keyboards or any other mechanism for a human user to enter information.

In some examples, Supervisory Control and Data Acquisition (SCADA) processes and systems are used for remote monitoring and control of industrial control systems and individual components within the industrial control machines and systems. For instance, SCADA systems may be used to operate various types of hardware such as programmable logic controllers (PLCs) within these control systems. The control system itself is designed to operate with the remote equipment (PLCs) by using communication protocols for data acquisition. SCADA systems are typically large-scale in geographic coverage and include several sites that may span different geographical regions.

Historian processes typically utilize software that can obtain or accumulate data obtained by the SCADA systems and store the data in the database. Additionally, events and alarms in a database may be presented as trends displayed at the HMI.

The HMI presents the data to a human operator (and others), and monitors and interacts with a SCADA system and the Historian process.

HMI screens can be typically only displayed on systems with some particular program or software also being installed at the system. These screens also need to be generated using proprietary software and are costly to maintain, requiring some sort of versioning programs. Eventually, users end up having to maintain legacy systems as these screens are not portable and compatible across versions.

The above-mentioned problems have resulted in some user dissatisfaction with previous approaches.

BRIEF DESCRIPTION OF THE DISCLOSURE

The approaches described herein provide for methods and devices for providing dynamically generated screens that present information associated with an industrial machine or system.

In many of these embodiments, a model stored in a memory is accessed. The model describes a visualization of information related to the operation of one or more industrial control machines or systems. Display information is received from the one or more industrial machines or systems. Context information is received from one or more sensors. Context information can also be received from user input, for example, as the user navigates and makes selections from a model tree. A display screen is graphically rendered at a graphical display unit to one or more users. The content of the display screen is based upon the model, the display information, and the context.

The context information may be any combination of the geo-location of the user, a relationship between two industrial assets, a user status, and a user input. Other examples are possible. In examples, the display screen may be rendered at a portable electronic device or at a device that is fixed in geographic location.

In other examples, an apparatus includes a memory, a graphic display unit, and a processor. The memory stores a model, and the model defines or describes a visualization of information related to the operation of one or more industrial machines or systems. The graphic display unit includes a display screen.

The processor includes an input and an output and is coupled to the memory and the display screen. The processor is configured to receive display information from the one or more industrial machines or systems at the input. The processor is configured to receive context information from one or more sensors at the input. Context information can also be received from user input, for example, as the user navigates and makes selections from a model tree. The processor is configured to (via the output) dynamically render a display at the display screen of the graphical display unit. The content of the display screen is determined based upon the model, the display information, and the context.

BRIEF DESCRIPTION OF THE DRAWINGS

For a more complete understanding of the disclosure, reference should be made to the following detailed description and accompanying drawings wherein:

FIG. 3 comprises one example of a model according to various embodiments of the present invention;

FIG. 5 comprises one example of a modification of model information according to various embodiments of the present invention;

Figure 1:
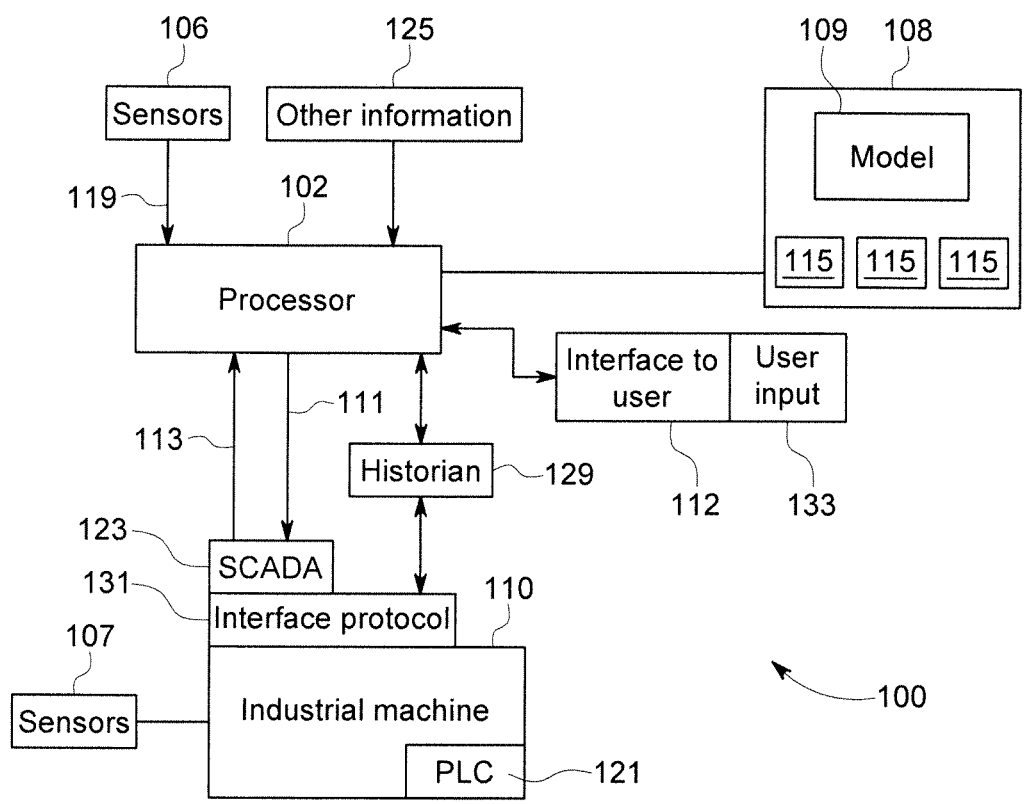
FIG. 1 comprises a block diagram of a system for the dynamic rendering and presentation of a screen to a user according to various embodiments of the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE DISCLOSURE

In the present approaches, a display at an electronic device (e.g., cellular phone, personal computer, laptop, or tablet) may be influenced, determined, and/or modified by the context information. The display is used to present screens having information associated with an industrial machine or system.

As such, context-based views are provided. As used herein, "context" can refer to the geographic location of a user (or a user device), security-related information (e.g., whether a user is a supervisor or operator), the time of day, measurement values, the relationship of assets with respect to each other, or any combination of these elements. "Context" can also be provided by user input. For example, a user's navigation of a model tree (e.g., showing pieces of equipment in a system) and selections from the model tree can also provide the context. In some situations where a process level presentation is desirable, an overview screen may be displayed. A user may "drill down" on the screen (e.g., using a mouse to click on hyperlinks on the screen) to go to other more detailed levels. As the user drills down, views become more detailed with more control properties or diagnostics are presented.

To take one specific example, if users are operating a mobile device, operating characteristics for assets associated with an industrial machine in proximity to the device can be obtained based on geo-location of the user device, and related views can be displayed on to the HMI display automatically and without any user interaction.

In other aspects, asset relationships are used in determining the display and a user's traversal of a model tree can be used for this purpose. As users navigate the model tree, asset relationships can be automatically analyzed based on pre-defined and/or customized associations. For instance, when viewing a pump (and information associated with the pump, a valve associated with the pump having a particular state) can also be analyzed. The state of the valve can also be utilized in the visualization without any special queries made by the user. It will be appreciated that these are but a few examples of application of the present approaches and that other examples are possible. All types of information including but not limited to alarms, status, and values may be displayed.

Referring now to FIG. 1, a system 100 that renders information to users is described. An industrial machine or system 110 is coupled to a processor 102. Commands 111 are sent from the processor 102 to the industrial machine or system 110, and information (or content 113) is sent from the industrial machine or system 110 to the processor 102. A memory 108 stores various data and processes. The information 113 may be data obtained from the industrial machine or system 110.

In aspects, the industrial machine or system 110 is a group of devices or components. Additionally, the industrial machine or system 110 may include associated software that controls hardware components. In one example, the industrial machine or system includes pumps, valves, mixers, burners, motors, or any type of machine that is usable to execute an industrial process such as move or controlling the flow of liquid or gases. Other examples are possible. A programmable logic controller (PLC) 121 may be deployed at the industrial machine or system 110. The PLC 121 may include a microprocessor and may control the operation of some or all of the components of the industrial machine or system 110. Although one PLC is shown here, it will be understood that any number of PLCs may be deployed at the industrial machine or system 110 and operated as described herein.

In other aspects, the industrial machine or system 110 includes sensors 107 or other measurement devices that sense operational conditions of the industrial machine or system 110 or the environment in which the industrial machine or system 110 is located. For example, temperatures, pressures, flow rates, and other conditions may be sensed. Other examples of measurements may be made.

The industrial machine or system 110 may include or comprise "assets." By "asset" and as used herein, it is meant the individual parts, machines, or devices that comprise the industrial machine or system 110. For example, valves, switches, motors, or similar devices may be considered as assets. Other examples of assets are possible.

The processor 102 receives context information 104 from sensors 106. In one example, the processor 102 is a microprocessor that executes programmed computer instructions.

In aspects, the sensors 106 may sense context information 119 (e.g., the geographical location of a user) or the relationship (e.g., whether two assets are located together or operate together) between two assets. In these regards, the sensors 106 may be located at a user device (e.g., mobile electronic device), a person computer, laptop, or tablet. Context can also be provided by user input. For example, a user's navigation of and selection of elements on a model tree (e.g., showing pieces of equipment in a system) can also provide the context. The user may make selection in any way, such as using a computer mouse to select a hyperlink or other link associated with an icon on the screen.

A Supervisory Control and Data Acquisition (SCADA) system or process 123 that is configured to remotely monitor and control various types of hardware and/or software at the industrial machine or system 110 may be used. For example, the processor 102 may control the operation and otherwise interact with the PLC 121. Commands 111 are transmitted to the industrial machine or system 110 via SCADA process 123 and interface protocol 131. Components within the industrial machine or system 110 execute these commands.

The commands 111 may instruct a component of the industrial machine or system 110 to perform some function (e.g., command to open or close a switch or valve) or the command 111 may request a measurement (e.g., measure a pressure or temperature at a valve). Other examples are possible.

Information 113 may be returned from the industrial machine or system 110 to the processor 102 via the interface protocol 131 and the SCADA process 123. The information can be the result of sending the command 111, or may be information routinely supplied (e.g., measurement values routinely supplied by the industrial machine or system 110 to the processor 102). The information (or content) 113 may be used when rendering a display to the user at interface 112, stored in the memory 108, or processed for other purposes.

As mentioned, the system 100 also includes the memory (or database) 108 and the memory 108 stores a model 109. A Historian process 129 may also operate with the industrial machine 110. When executed, the Historian process 129 can accumulate data, events and alarms and store this information in the memory 108. Queries or commands from a user interface 112 may be used to access, process, or render this information to a user.

The memory 108 may be any suitable type of memory, including volatile or non-volatile memories such as random access memory (RAM), dynamic RAM (DRAM), synchronous RAM (SRAM), read-only memory (ROM), programmable ROM (PROM), erasable PROM (EPROM), electrically erasable PROM (EEPROM), non-volatile RAM (NVRAM), flash memory, solid state drives (SSD), embedded Multi-Media Card (eMMC). Other examples are possible.

The interface 112 (e.g., human machine interface (HMI)) presents or renders the data to a human (operator and others), and allows monitoring and interaction with the SCADA process 123 and the Historian process 129. The interface 112 may include any type or configuration of screen, display, touch screen and may also include devices that allow a user to enter information or selections (e.g., a keyboard, key pad, or utilize a touch screen for data entry). It will be understood that the interface 112 may be located at, within, or be coupled to any type of portable or fixed-in-location electronic device such as a personal computer, lap top, cellular phone, personal digital assistant, or tablet. Similarly, the sensors 106, processor 102, and memory 108 may be located at the same electronic device or at a different electronic device.

The user can monitor and send commands 111 to the SCADA process 123. Commands can also flow in the opposite direction. The SCADA process 123 communicates with and interacts with an interface protocol 131. The Historian process 129 also communicates with and interacts with an interface protocol 131. The interface protocol 131 converts communications from the SCADA process 123 and the interface protocol 131 to a format or protocol recognizable and actionable by the industrial machine 110 (e.g., the PLC 121 at the industrial machine 110). The interface protocol 131 also allows communication from the machine 110 to the SCADA process 123 and/or the Historian process 129. For example, information 113 from the machine 110 can flow from the interface protocol to the SCADA process 123, and then to the processor 102. In other words, the interface protocol allows communication between the SCADA process 123 and the industrial machine 110, as well as between the Historian process 129 and the industrial machine 110. The Historian process 129 can send data to the memory 108.

Communication between the processor 102 and the industrial machine 110 can be bi-directional or uni-directional. The interface protocol 131 may implement the OPC Unified Architecture (OPC UA), which is an industrial M2M communication protocol developed by the OPC Foundation.

The interface 112 renders information to the user dynamically in the form of a screen. In some aspects, widgets 115 included are software routines (and/or combinations of hardware and software) that render display information to the user in the form of a screen or some other type of visualization. The widgets 115 can be customized by a user to perform specific display functions. In one example, the processor 102 uses a combination of the model 109, context information 119, information 113, user input information 133 and other information 125 to form a customized screen that is rendered to the user at the interface 112.

The model 109 describes a visualization of one or more graphical displays that can be rendered to a user at the interface 112. In the present approaches, the exact visualization associated with the model 109 is customizable and changes over time based upon any combination of the context information 119, the information 113, user input information 133, and/or other information 125. The other information 125 may be entered by the user at the interface 112, may be stored in the memory 108, may be entered at one point during system initialization, or may be changeable during system operation.

User input information 133 may include information relating to user input at the interface 112. For example, the user's navigation and selection of elements in a model tree may be obtained and included as the user input information 133.

The other information 125 may include form factors of the device, screen at the device, or some other system component (or relationship of components). By "form factor" it is meant the physical size, shape, and/or dimensions of a component. In these regards, auto-generated views can be optimized by the processor 102 to suit the HMI device without requiring any screen configuration or re-configuration for the device where the screen is located (e.g., desktop, laptop, notebooks, tablet and smartphones). In aspects, data and other information is presented at the interface 112 in a suitable layout for all form factors and with necessary restrictions (security and bandwidth).

The other information 125 can also include user profiles information that is used to determine how information is to be displayed. In one example, the other information 125 may include security information related to the user. For example, certain users may be allowed to view certain types of information while other users may be allowed to view other types of information. To take a specific example, two typical profiles, Operator and Supervisor, may be used. Operators receive limited access to a model navigation tree (showing a graphic representation of the model 109) and are thereby restricted to certain hierarchy levels or descendants. Views also may be adjusted based on the logged in profile. For example, an operator may obtain a detailed diagnostic view as he or she drills down the hierarchy, while a supervisor may be provided with an analytic view to provide insight into process efficiencies. Other examples are possible.

To take another example, a display may include a bar graph, text, and a toggle switch. The model may have or be organized according to types and sub-types. One field of the model may indicate properties for the bar graph, another field may describe the text, and another field may describe aspects of the toggle switch.

In one example, the bar graph representation may be set to "analog" (e.g., the bar graph is shown as an analog component). The text may be set to "ASCII" (e.g., the text shown on the display is ASCII). The toggle switch may be set to "discrete" (e.g., the toggle switch is shown as a discrete component).

The different software widgets 115 are used to perform the visualization for the user on the screen. In these regards, the software widgets are customizable software routines (e.g., computer instructions) that render information on the user interface 112. In other words, once a visualization is determined, the visualization is mapped to particular widgets in the memory 108, the widgets are executed and the display is rendered to the user. A library of widgets can be created by a user and stored in the memory 108 with each widget in the library selected and deployed for a predetermined purpose or function.

It will be appreciated that the present approaches provide dynamic content generation for displays that are rendered to users. That is, as context information or other parameters change over time, the screen rendered to a user changes. In different aspects, the context could be controlled by pre-configured or customized business rules (to cover widget libraries), general context-based (e.g., different screens defining different levels), form factors (to cover for condensed views), user profiles (supervisor vs operator), user interaction (filters, sorts, selections from a model tree, and so forth), or geographic context (navigation or geo-location). Other examples are possible.

Figure 2:
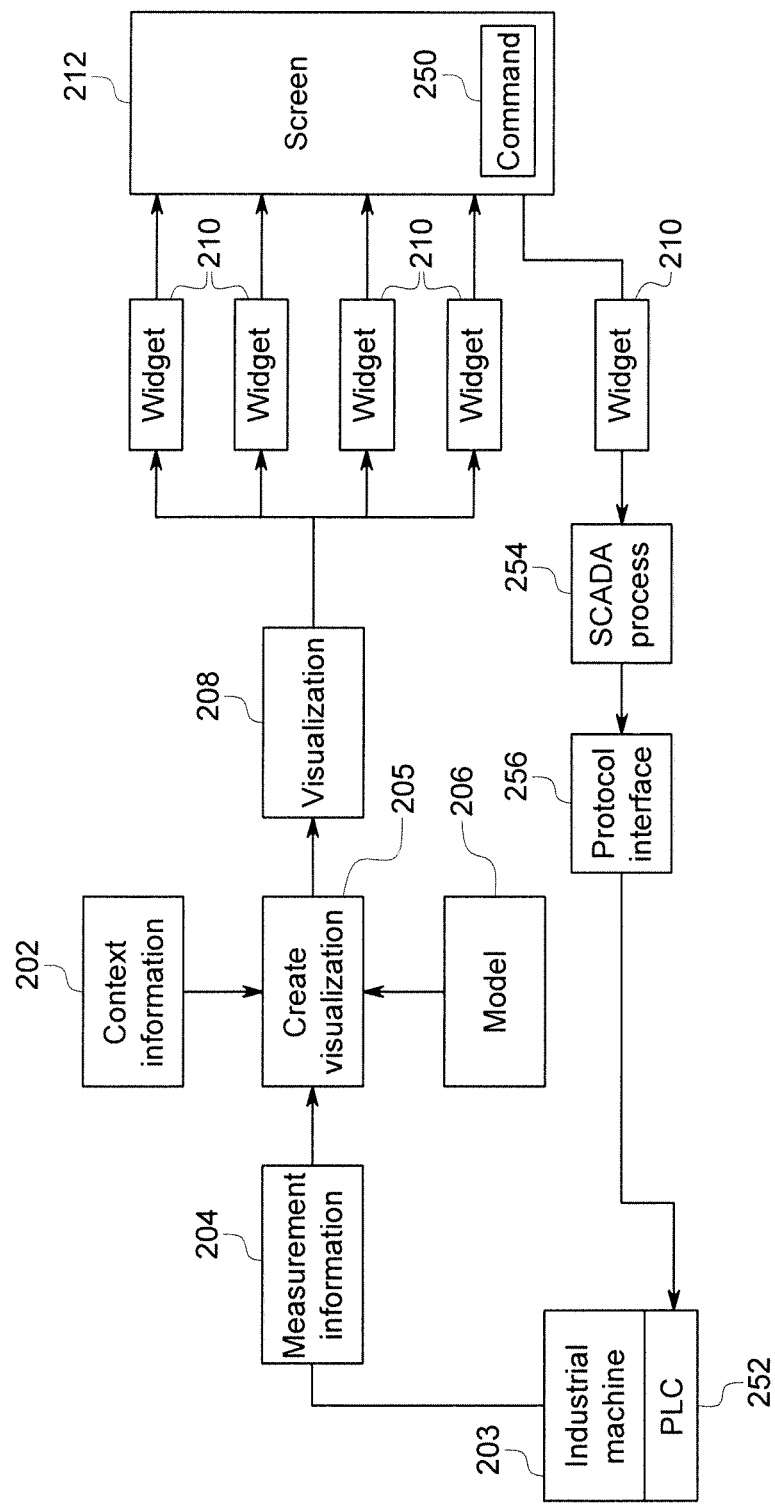
FIG. 2 comprises a block diagram showing aspects of dynamic rendering and presentation of a screen to a user according to various embodiments of the present invention.

Referring now to FIG. 2, one example of dynamically rendering a display screen is described. A processor (e.g., a microprocessor) applies context information 202 and measurement information 204 to a base model 206 via a process 205, which determines a visualization of the dynamic display screen 212. The visualization 208 is implemented by widgets 210 to create the dynamic display screen 212 on a graphical display unit.

The context information 202 may include any type of context information. For example, geographic location of user (geo-location), the user profile (whether the user is an administrator), form factor information (the dimensions or shape of a user screen or user device), and user input may be used. Other examples are possible.

Measurement information 204 includes information obtained at an industrial machine or system 203 and these values are to be displayed on a screen for the user. For example, the speed of an engine may be measured and this speed may be displayed.

In aspects, the base model 206 is a base model that describes a rendering or display screen. The information in the base model 206 is associated with a base screen or display, but this base display screen may be dynamically altered over time and the altered screen dynamically rendered a graphical display unit to a user. The altering of the screen may occur at preset or periodic intervals (e.g., every minute), or may be initiated by the occurrence of an event (e.g., change in geographic location of the user), or some combination of these factors.

The base model 206 describes how a visualization is to be rendered in the absence of any applied context information. The base model 206 may be described in "free form" language of any particular style, format, or protocol. In one example, the base model 206 may divide assets into types and subtypes, and use keywords. Using a free form model advantageously unifies different and variant data systems for data acquisition and visualization purposes.

In one example of the operation of the system of FIG. 2, the base model 206 is accessed. It is then determined (based upon some combination of the context information 202 and measurement information 204) whether adjustments to the base display (described by the base model 206) need to be made. Based upon this evaluation and analysis, a visualization 208 is created. The visualization 208 utilizes one or more widgets 210 (which may be customizable and part of a software library) to physically render the graphics to the user.

The visualization 208 is the result of modifying the model based upon the context information 202 and the measurement information 204. The visualization 208 may be in any form or format.

Widgets 210 are configured to create a dynamic displays screen 212. The widgets take the visualization and physically create the screen. In this sense, they are an interface between a model (as modified by, for example, context information) and the user. The widgets 210 in one example are software routines that map display items to particular hardware displays. The widgets 210 are customizable by a user (to include certain widgets based upon the needs of the user or system) and may be deployed in groupings to form widget libraries. Widgets can be implemented as any combination of hardware and software components.

The user can enter commands 250 at the screen 212 to modify the operation of, for example, of a PLC 252 at the industrial machine. The commands 250 flow through a widget 210, then to a SCADA process 254, and then to a protocol interface 256 (performing conversion functions to format the commands 250 according to an appropriate protocol) before reaching the PLC 252. In one example, the user may click an icon on the screen 212 to change a pressure rate.

Referring now to FIG. 3, one example of a model 300 for a displacement pump is described and the model 300 includes a first row 302 (for a control mode), a second row 304 (for operation mode), a third row 306 (for speed), a fourth row 308 (for manufacturer), a fifth row 310 (for total runtime), a sixth row 312 (for gallons-per-minute), and a seventh row 314 (for horsepower). A first column 316 represents a field in the display, and a second column 318 represents the type for the field.

In this example, the first row 302 (for a control mode) is set to "discrete" (e.g., an on/off switch). The second row 304 (for operation mode) is also set as a discrete switch. The third row 306 (for speed) is set to "analog" for an analog gauge that shows a range. The fourth row 308 (for manufacturer) is set to "ASCII" to specify the type of text used. The fifth row 310 (for total run time) is also set to an analog gauge. The sixth row 312 (for gallons-per-minute) and the seventh row 314 (for horsepower) are also set to ASCII.

Figure 4:
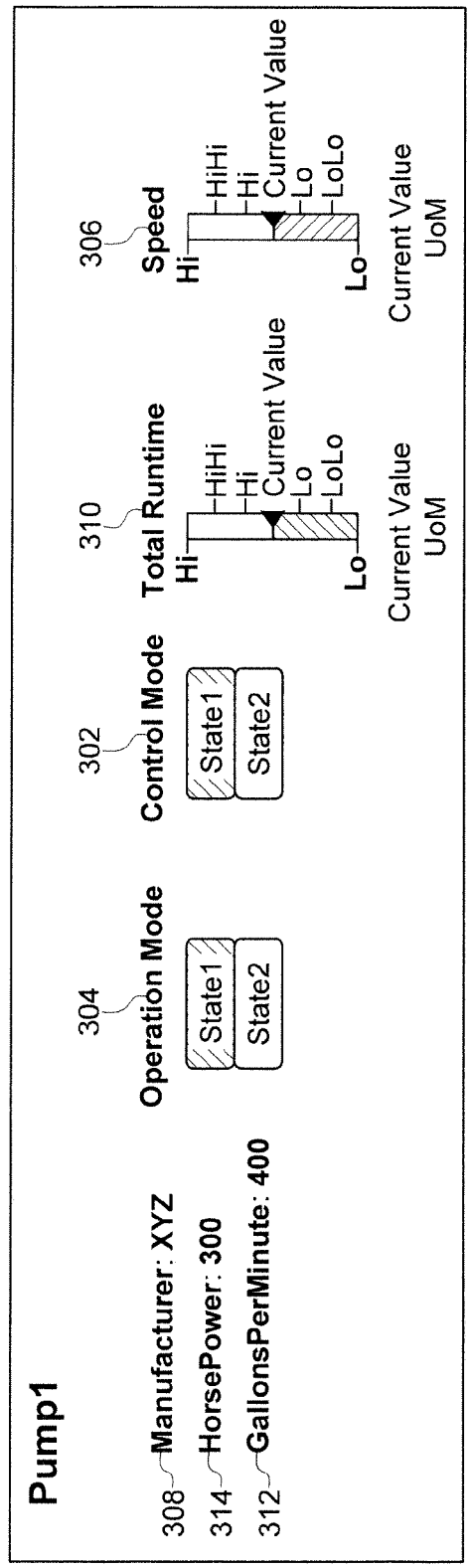
FIG. 4 comprises one example of a screen according to various embodiments of the present invention.

Referring now to FIG. 4, the rendering or display generated corresponding to the model 300 (with no modifications made by context) is shown.

Referring now to FIG. 5, an example of how information presented to a user can be modified over time is described. It will be appreciated that the underlying information in the model (defining a display) is not changed (i.e., the model is not re-written or altered), but some or all of the base model may be modified to render a modified display that is presented to a user. In aspects, the context changes the display.

Figure 6:
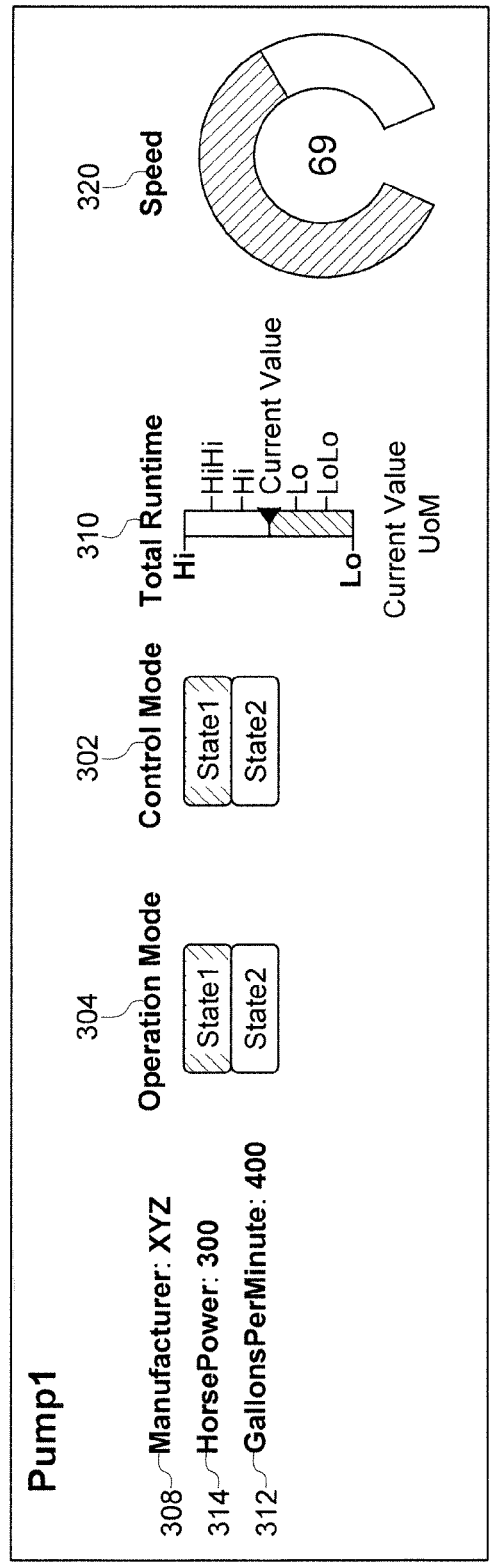
FIG. 6 comprises an example of a dynamic screen using the modifications of the model of FIG. 5 according to various embodiments of the present invention.

In the example of FIG. 5, the same labels are used for elements as used in FIG. 3 and the explanations for these elements will not be repeated here. However, in this example some context changes (e.g., the type of user or the geo-location of the user changes). This context change maps to a change in the third row 306 of the model. More specifically, the third row 306 (for speed) need be changed to a dial gauge (indicated by label 320). Consequently, as shown in the display of FIG. 6, the analog gauge is replaced with a dial gauge on the display presented to the user.

Figure 7:
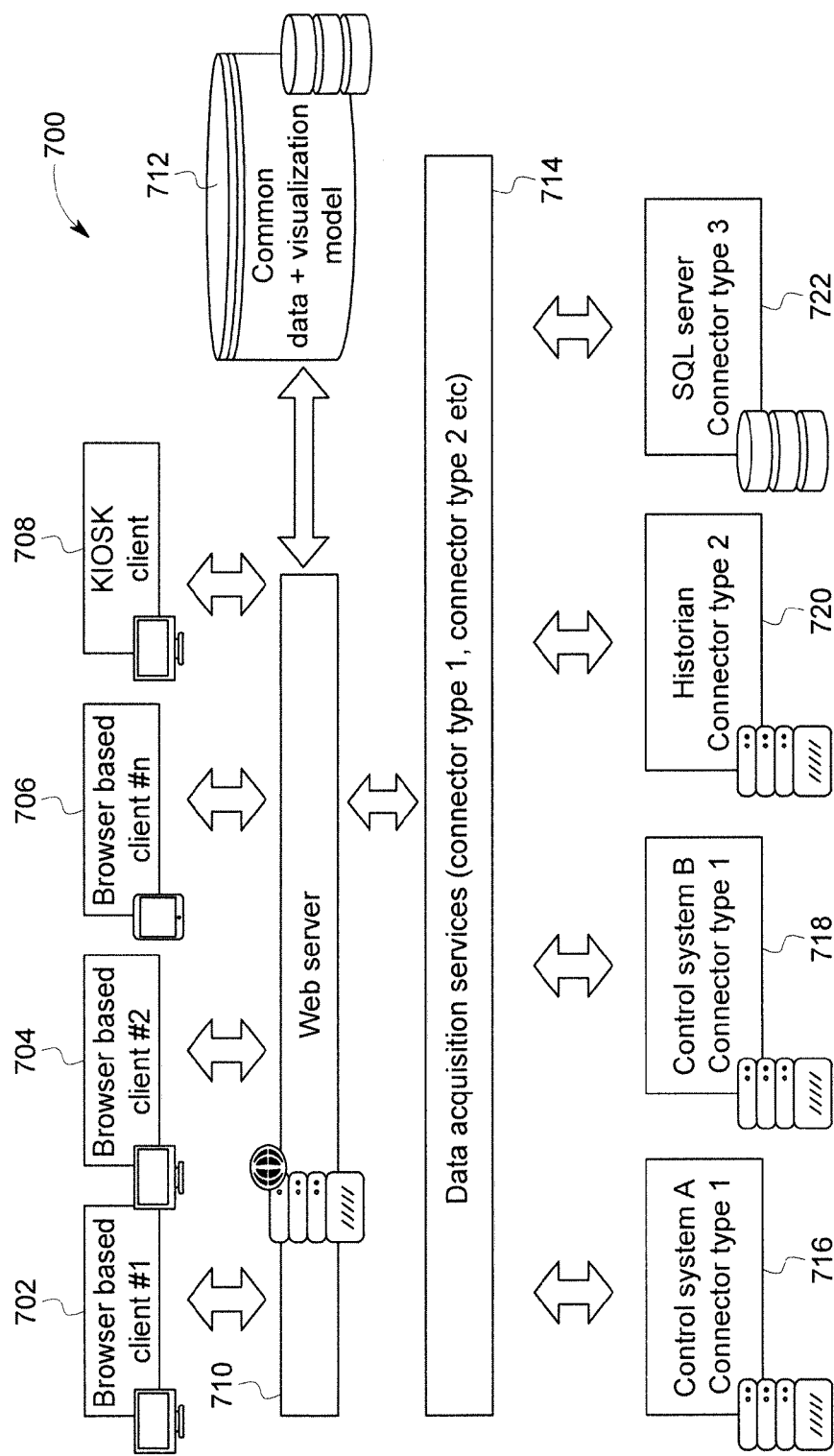
FIG. 7 comprises a block diagram of a system for the dynamic rendering and presentation of a screen to a user according to various embodiments of the present invention.

Referring now to FIG. 7, a system 700 includes a first client 702, a second client 704, a third client 706, a fourth client 708, a web server 710, a database or memory 712, data acquisition services 714, a first control system 716, a second control system 718, a Historian system 720, and an SQL server/database 722.

The first client 702, second client 704, third client 706, fourth client 708 may be user devices such as personal computers, laps tops, tablets, or cellular phones. Each of these devices may include a display (e.g., a screen or touch screen) and/or mechanisms for allowing a user to enter data or commands. The clients 702, 704, 706, and 708 may include a processor (e.g., the processor 102 of FIG. 1) that creates visualizations that are made on the screen. This functionality may also be included with the web server 710.

The web server 710 acts as an interface to route data, commands, and other information between the clients 702, 704, 706, and 708, and the memory 712 as well as the control systems 716 and 718.

The database or memory 712 includes a model as described elsewhere herein.

Data acquisition services 714 provide an interface between the web server 710 and the first control system 716 and the second control system 718. In these regards, the data acquisition services 714 may be any combination of hardware and/or software that provides access and may include translation, transmission, and receiving functions.

The first control system 716 and the second control system 718 are control systems that control the operation of industrial machines. For example, these control system systems may control the operation of industrial systems such as pumps, valves, motors, and switches to mention a few examples. Sensors to measure various types of information (e.g., pressure, temperature, and speed) may be deployed at these devices. The control systems 716 and 718 may be implemented as PLCs in some aspects. The control systems 716 and 718 may report measured data from sensors to the web server 710 via the data acquisition and services 714.

The Historian system 720 collects data from the first control system 716 and the second control system 718 and stores this data, for example, in the database or memory 712.

The SQL server/database 722 is a server and/or relational database that stores historical data. In one aspect, any data can be visualized in a context, an example is overall equipment efficiency (OEE) that can be calculated based on a few values using formulas and stored in relational databases such as the SQL server/database 722.

In one example of the operation of the system of FIG. 7, a base model that is stored in the data base or memory 712 is accessed. The base model describes a base visualization of information related to the operation of one or more industrial control machines or systems. Display information (e.g., sensor readings) from the one or more industrial machines or systems is received. Context information is also received, for example, from one or more sensors (e.g., describing the geographic location of a user). Other types of context information may include a user profile information (e.g., whether the user is an operator or supervisor), form factor information (e.g., form factors of the electronic device where a screen is to be rendered), or user input. Other examples are possible.

A display screen is dynamically and automatically (without the need for human or user intervention) rendered at a graphical display unit at one or more of the clients 702, 704, 706, and 708 to the one or more users. The content of the display screen is based upon the model, the display information, and the context.

Figure 8:
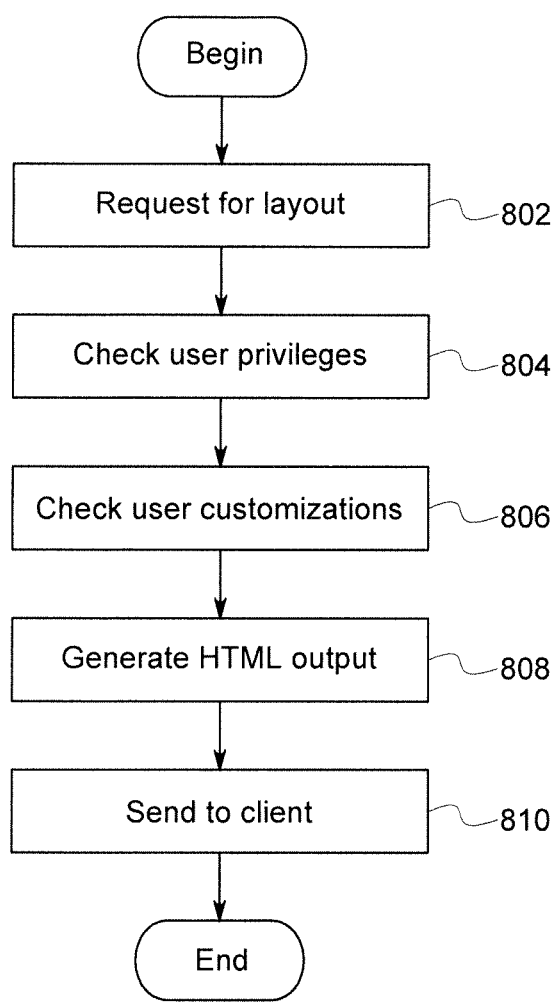
FIG. 8 comprises a flowchart showing one approach for creating a dynamic display screen according to various embodiments of the present invention.

Referring now to FIG. 8, one example of creating a visualization is described. This process may be executed by a processor. The user may also have some interaction with the process by making selections or issuing commands.

At step 802, the user may request the layout of the screen. This may be performed by a key pad or touch screen to mention two examples. The layout may relate to a model stored in a memory or data base.

At step 804, the system checks for user's privileges, for example, whether the user is a system administrator with different privileges than a normal user. The privileges for a particular user may be stored in a file, or the user may indicate these privileges. In one aspect, the act of a user logging into the system indicates their profile and associated privileges.

At step 806, the system checks for user customizations. Further, a check is made to see if there are other customizations for a specific user. For example, a particular user or type of user may have certain display customizations that are to be used.

At step 808, visualization is generated using widgets. The visualization is created by considering the user privileges and any specific user customizations and selectively changing a base model according to an analysis of these factors. For instance, a specific type of user may be presented with pre-determined types of information, while another type of user may be presented with other types of information. In some example, the different factors used to create the display may be weighted. For example, a user profile may be given a greater weight than user customizations when the determination is made as to the visualization to create. The output of the widgets may be a HTML output. Other examples are possible.

At step 810, this output is sent to the display (client) for rendering. In one example, HTML output is sent to a graphic display unit (e.g., a screen or touch screen) for presentation to a user.

Figure 9:
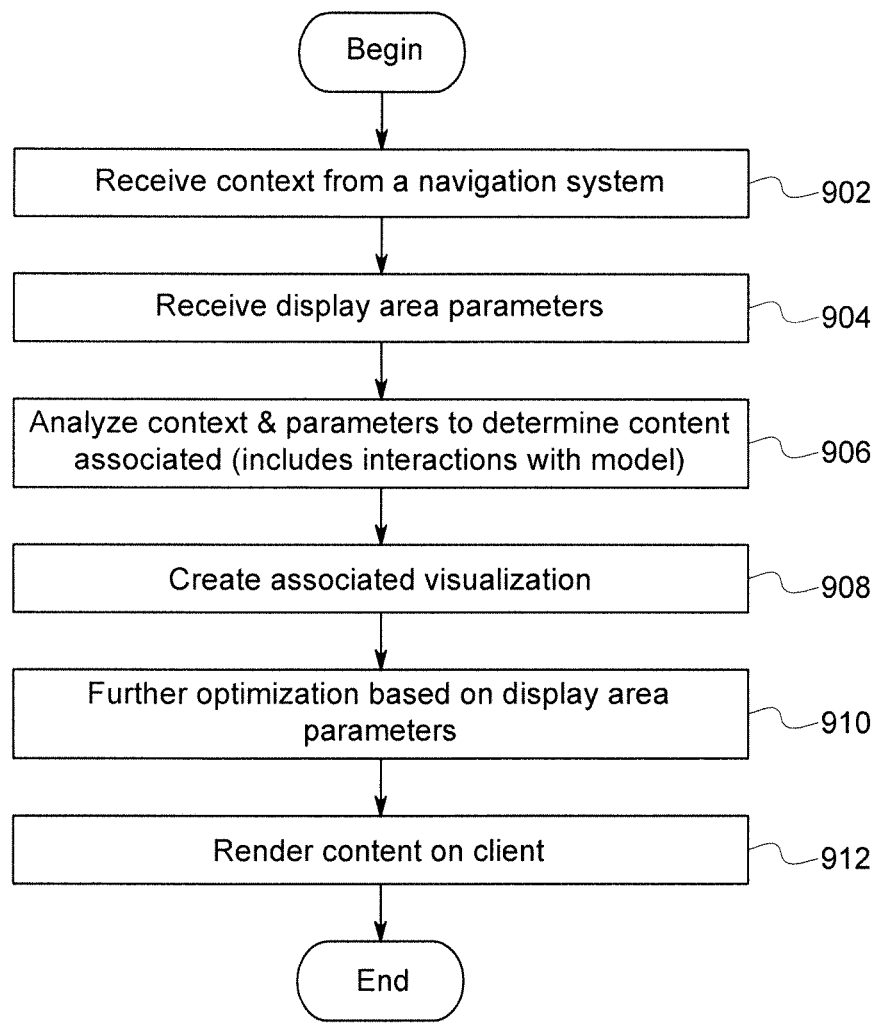
FIG. 9 comprises a flowchart showing another approach for creating a dynamic display screen according to various embodiments of the present invention.

It will be appreciated that the example of FIG. 8 is one example of the automatic and dynamic generation of a screen. Referring now to FIG. 9, another example of dynamically and automatically creating a visualization as a screen for display is described. As with the example of FIG. 8, these steps are performed on-the-fly and in real time. In one aspect, these steps may occur periodically. Or, in other aspects, a random or non-periodic occurring event may cause the steps to be performed asynchronously in time.

At step 902, the geographic context is received from a navigation system. This may be received from sensors or other information (e.g., GPS satellite information) that indicates the position of a user device.

At step 904, display parameters are received from the industrial machine or system. In some examples, these display parameters include form factors and sensed values from the industrial machine or system. In other examples, user input can serve as the context.

At step 906, the system analyzes context and display parameters. This step may include interactions with the model. The visualization is created by considering these factors and selectively changing a base model according to an analysis of these factors. For instance, a form factor and geo-location may result in predetermined changes to the display indicated by the base model. In some examples, the different factors used to create the display may be weighted.

At step 908, a visualization is created. In some aspects, this may be in an HTML format. Other examples are possible.

At step 910, any further optimization may be performed. For example, some browser types may indicate further optimization is needed.

At step 912, the content is rendered on a client. For example, the content may be rendered on a display screen.

Figure 10:
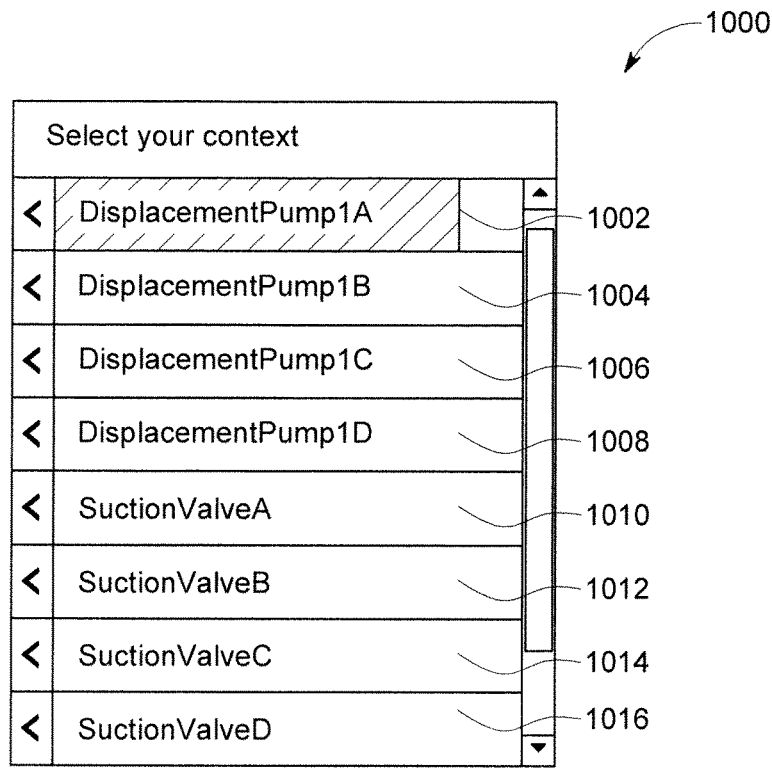
FIG. 10 comprises a diagram of one example of a model tree display according to various embodiments of the present invention.

Referring now to FIG. 10, one example of a user using a graphical tree 1000 that represents the model is described. The tree 1000 is a graphical representation as to the content of the model and is rendered to a user at a user interface. In this example, the tree includes a first field 1002 (indicating Displacement Pump 1A), a second field 1004 (indicating Displacement Pump 1B), a third field 1006 (indicating Displacement Pump 1C), a fourth field 1008 (indicating Displacement Pump 1D), a fifth field 1010 (indicating Suction Valve A), a seventh field 1012 (indicating Suction Valve B), an eighth field 1014 (indicating Suction Valve C), and a ninth field 1016 (indicating Suction Valve A).

Each of these fields may be a hyperlink and by clicking on the hyperlink, a user can drill down to and access different levels of information. For example, a user clicks on one of these fields (e.g., using a computer mouse or a touch screen) and see more information relating to the asset or parts of the asset.

In one example, a user (e.g., plant floor operator) may walk through the model to perform his or her daily tasks. The user checks water pressure in some pumping station, then goes back and ensures a storage tank meets daily level requirements, and then attends to an alarm happening somewhere in the system. All of these tasks are performed in conjunction with customized display screens that are rendered based on context information such as selections made by the user, interaction of the user, geographic location of the user, relationship of assets, and user display privileges. These screens are presented to the user as the user traverses through an industrial setting and aid the user in performing his or her tasks. The user may input information and this may serve as the context.

Figure 11:
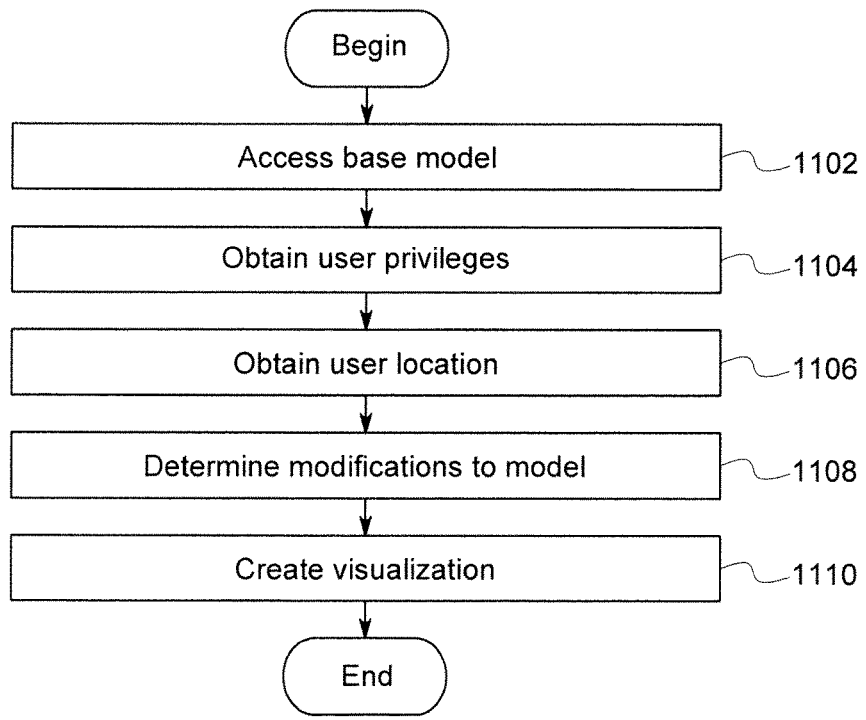
FIG. 11 comprises a flowchart of one example of determining how to modify a base model to create a visualization according to various embodiments of the present invention.

Referring now to FIG. 11, one example of determining a visualization based upon model information and the location of a user is described. It will be appreciated that this is one example of a process by which a visualization can be determined. It will be understood that a large variety of these processes can be determined based upon the needs of a particular user or system.

At step 1102, a base model is accessed and includes two fields 1104 and 1106. The fields describe a particular visualization (e.g., an analog or digital dial; a type of text to display).

At step 1104, user display privileges are received or determined. For example, the user may be an Operator or a Supervisor. This may be determined, in one example, by a user logging into the system.

At step 1106, the geographic location of the user is received or determined. This may, for example, be determined by receiving GPS location information. User input may also be used.

At step 1108, based upon the user privileges and location information, any modifications to the model are determined. For example, if the user is a Supervisor it may be determined that all information can be shown, while if the user is an operator some information is omitted. In another example, if the user is located next to an asset one type of gauge will be displayed, while if the user is at a different location another type of gauge is displayed.

At step 1110, a visualization is created using the model as modified by step 1108. This visualization may be rendered at a graphic display unit as a screen displayed or presented to a user.

Referring now to FIGS. 12A-12G, illustrations of visualizations (screens) showing overlays and a control view that can be flipped over to show the edit cards. The screens show a "Worchester Pump Station" with an inlet tank 1210, an outlet tank 1212 and various interconnecting components 1214 (e.g., pumps and valves). This screen allows the user to set values of PLCs (e.g., by selecting the correct view and clicking "confirm") and values are written to the PLC via a SCADA process and protocol interface. A trend area 1220 allows trends to be displayed, while an alarm area 1222 allows alarm displays.

Figure 12A:
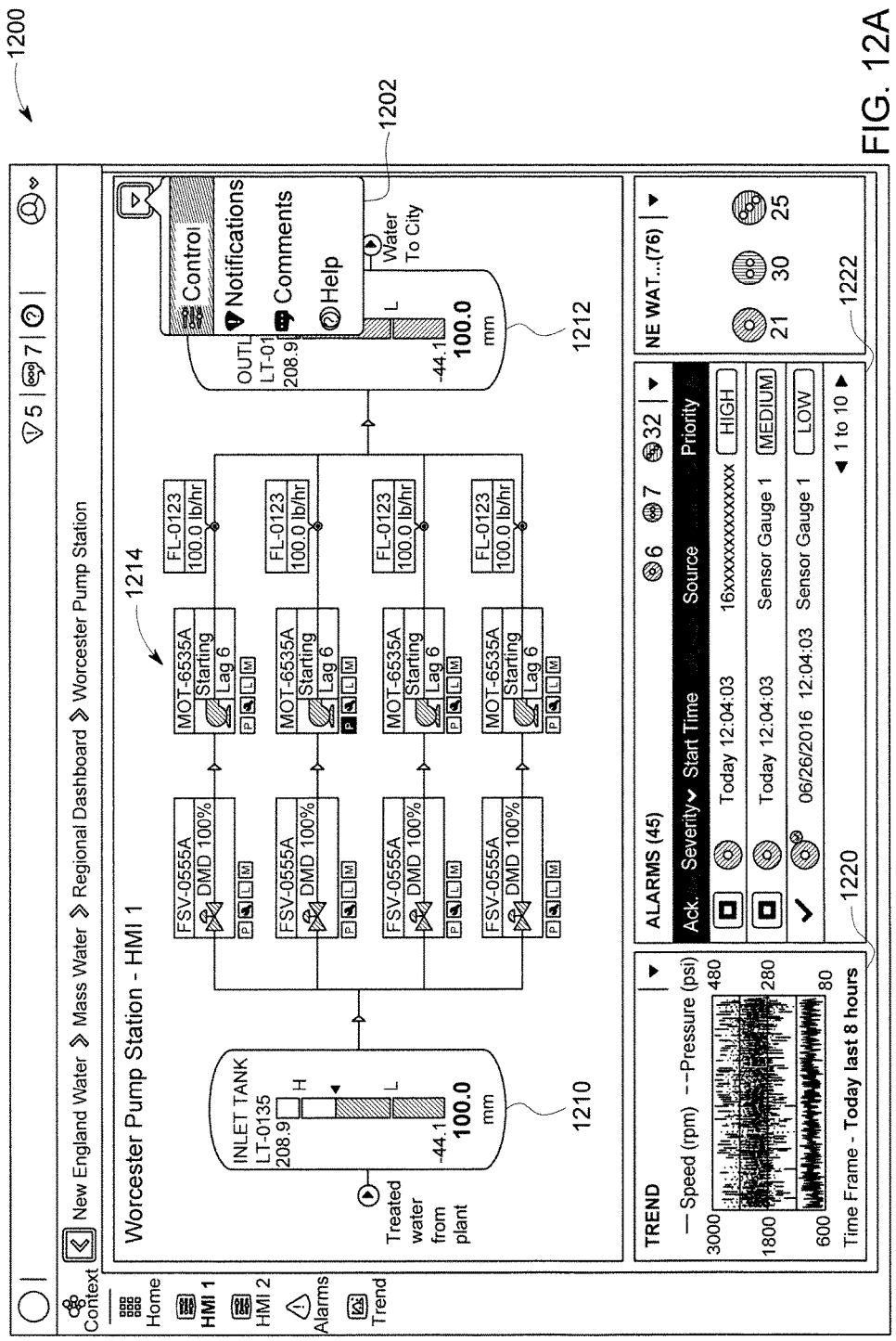
FIGS. 12A-12E show visualizations of a control process presented to a user according to various embodiments of the present invention.
Figure 12B:
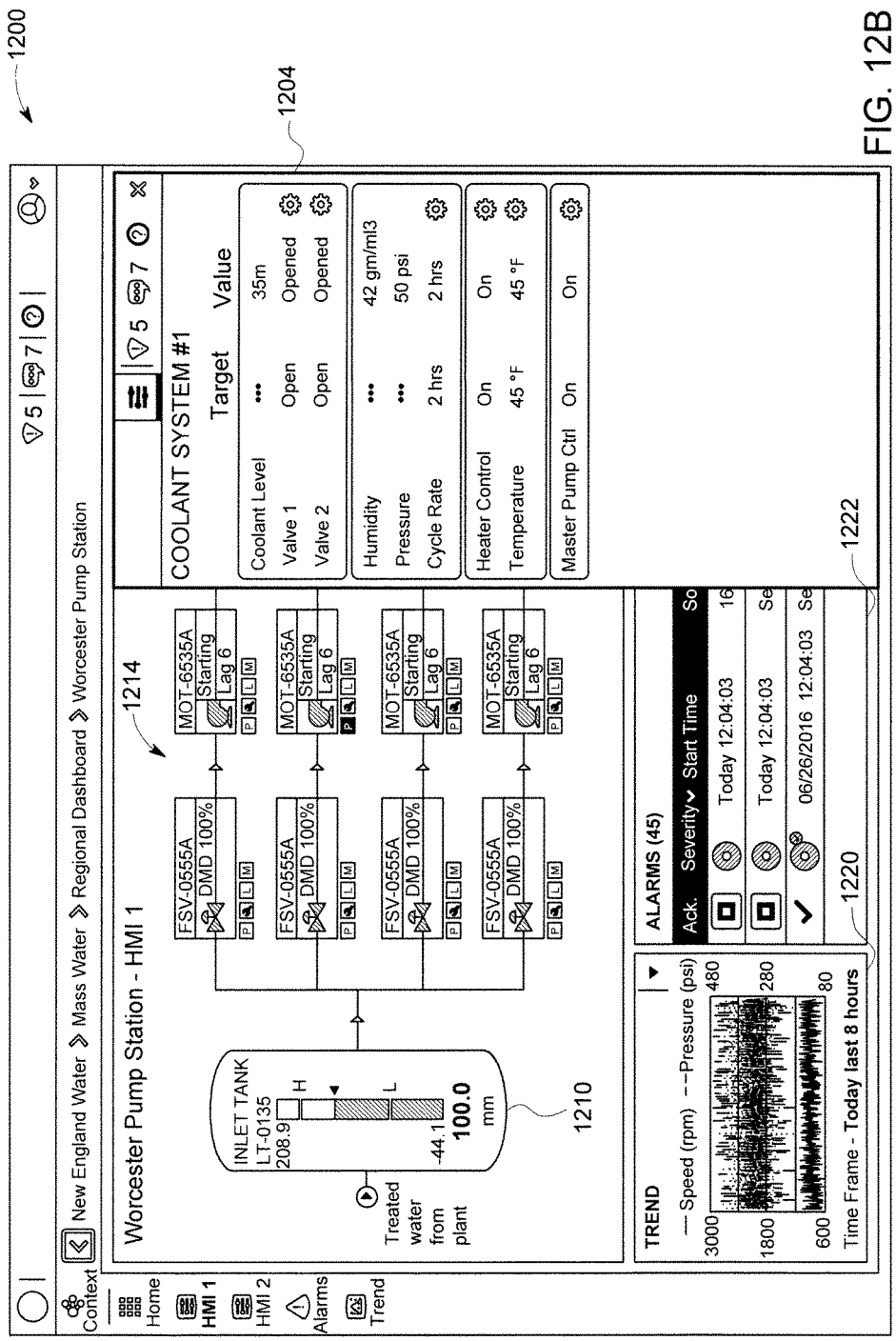

FIG. 12A shows an example of a visualization 1200 at a screen with an overlay 1202 (showing control, notifications, comments and help tabs). FIG. 12B shows an overlay 1204 (on the right side of the figure) after "Coolant System #1" has been selected. The overlay is displayed on the top of the screen of FIG. 12A.

Figure 12C:
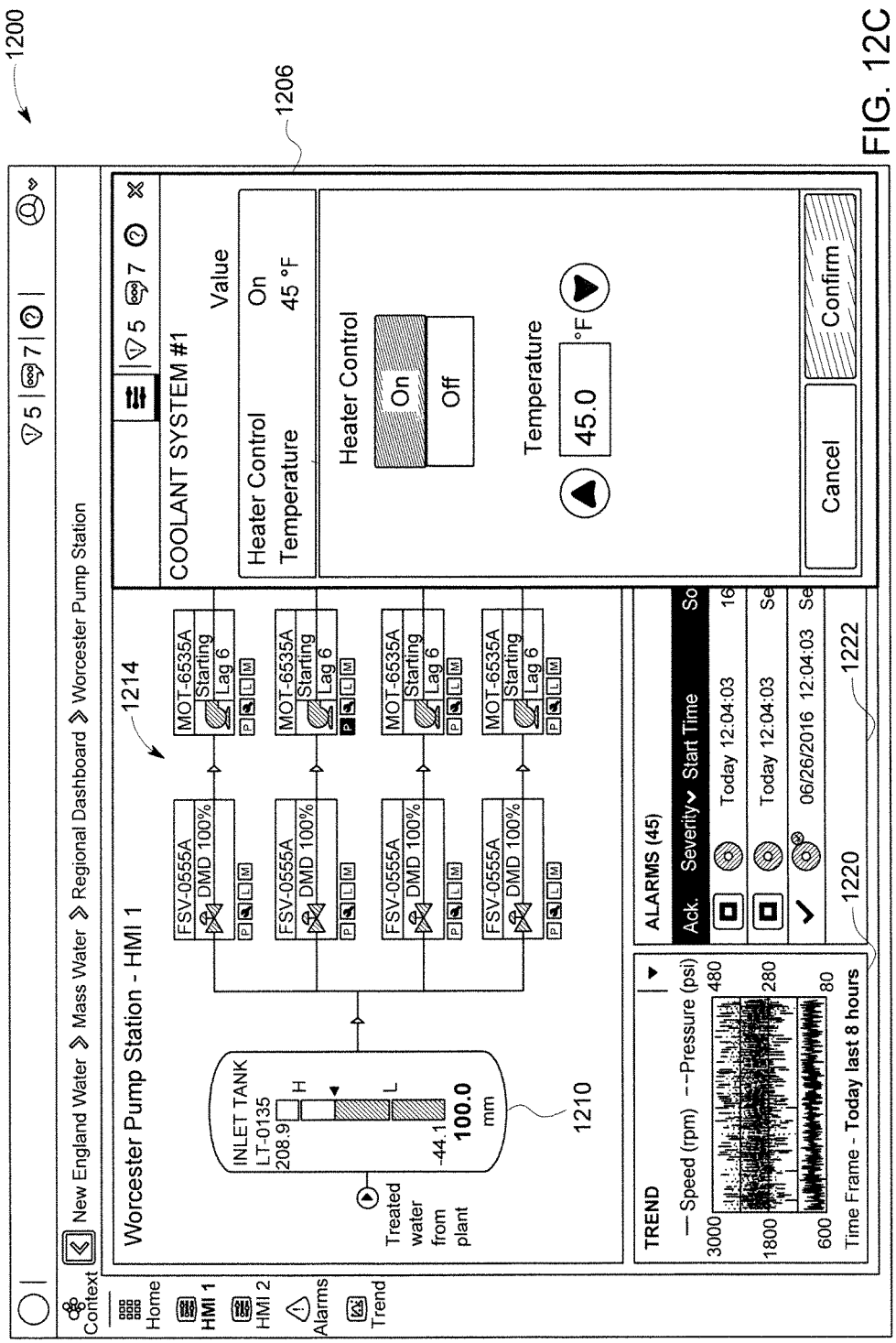
Figure 12D:
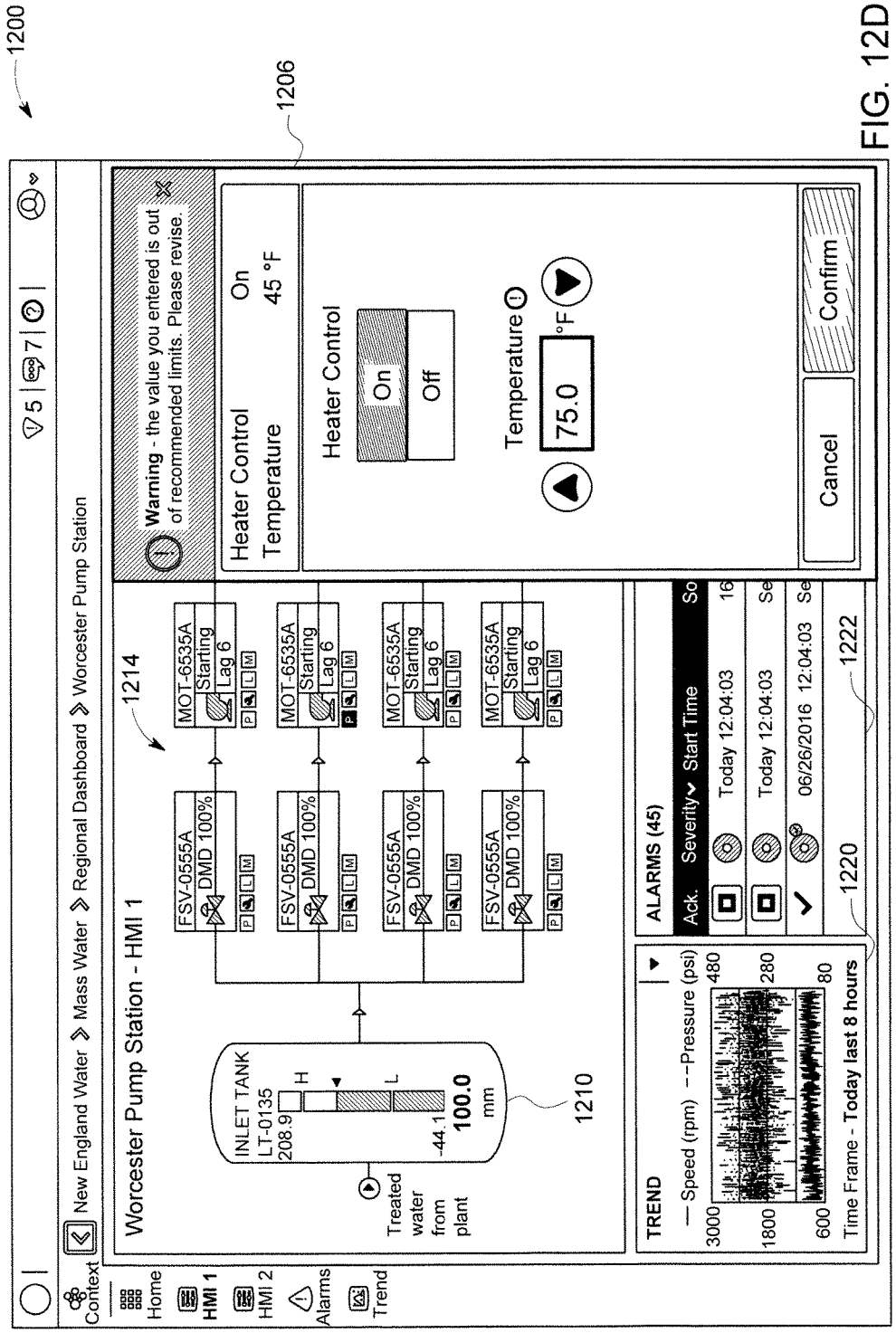
Figure 12E:
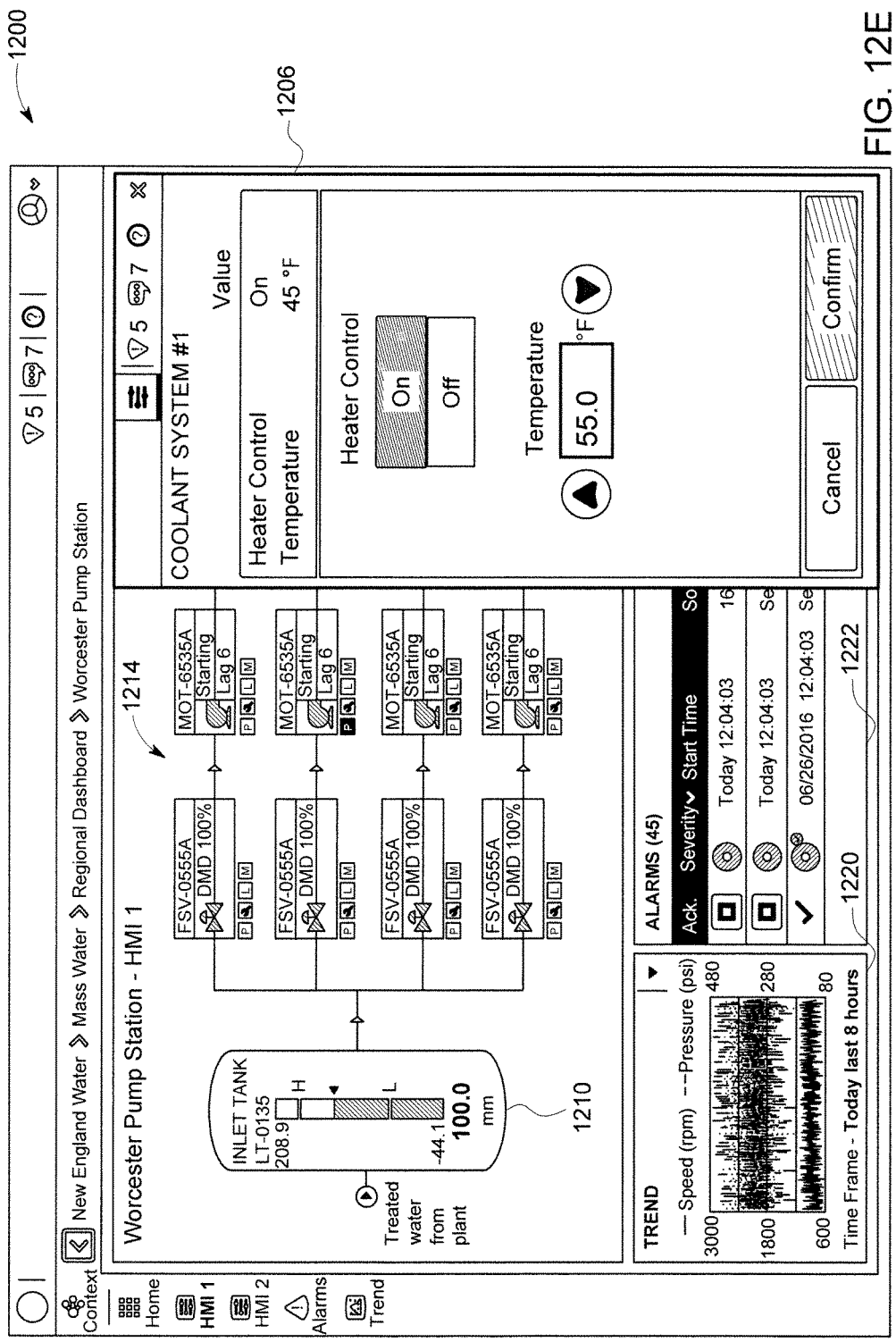

FIG. 12C shows another overlay 1206 after the user selects "heater control" from the screen of FIG. 12B. FIG. 12D shows changes to the screen of FIG. 12C as the user increases the temperature by clicking on the up-arrow icon on the overlay 1206. FIG. 12D shows a warning message on the top of the overlay 1206. FIG. 12E shows changes to the screen of FIG. 12D as the user decreases the temperature by clicking on the down-arrow icon of the overlay 1206.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A method performed by a computer processor, comprising:
    accessing a model that is stored in a memory, the model including information related to the operation of a first industrial asset and a second industrial asset, the second industrial asset being different the first industrial asset, wherein the memory and the computer processor are located separately from the first industrial asset and the second industrial asset;
    at a first time:
        receiving location information obtained from sensors at a user electronic device, the location information identifying the geographic location of the user electronic device at the first time, wherein the user electronic device includes an interface and the interface comprises a screen;
        receiving an indication of an identity of a first user of the user electronic device;
        receiving user input identifying a first traversal by the first user of a graphical tree that has been rendered on the screen of the user electronic device, the graphical tree being described by the model;
        receiving an indication of a form factor of the user electronic device;
        based upon one or more of the location information, the indication of the identity of the first user, the user input, and the form factor, creating and rendering on the screen a first visualization;

subsequent to the first time and at a second time:
  receiving updated location information obtained from the sensors at the user electronic device, the updated location information indicating that the user electronic device has moved to a second geographic location that is different from the geographic location where the user electronic device was located at the first time;
  receiving an indication of an identity of a second user, the second user being different from the first user;
  receiving second user input identifying a second traversal by the second user of the graphical tree that has been displayed on the screen;
  based upon one or more of the updated location information, the indication of the identity of the second user, the second user input, and the form factor, creating and rendering to the second user on the screen a second visualization, the second visualization being different from the first visualization;
  applying an overlay on top of the first visualization or the second visualization, the overlay including at least one control icon, and the first user or the second user actuating the at least one control icon to change an operational aspect of the first industrial asset or the second industrial asset.

2. The method of claim 1, wherein the model includes information describing a relationship between the first industrial asset and the second industrial asset.

3. The method of claim 1, wherein the user electronic device is a portable electronic device.

4. The method of claim 1, wherein the first user or the second user actuating the at least one control icon is effective to change a parameter at a programmable logic controller at the first industrial asset or the second industrial asset.

5. An apparatus, comprising:
  a memory, the memory storing a model, the model including information related to the operation of a first industrial asset and a second industrial asset, the second industrial asset being different the first industrial asset, wherein the memory is located separately from the first industrial asset and the second industrial asset;
  an interface that is coupled to a user electronic device, the interface includes a display screen and the user electronic device includes sensors;
  a processor with an input and an output, the processor being coupled to the memory and the display screen, the processor configured to, at a first time:
    receive location information obtained from the sensors at the user electronic device, the location information identifying the geographic location of the user electronic device at the first time;
    receive an indication of an identity of a first user of the user electronic device;
    receive user input identifying a first traversal by the first user of a graphical tree that has been rendered on the display screen of the user electronic device, the graphical tree being described by the model;
    receive an indication of a form factor of the user electronic device;
    based upon one or more of the location information, the indication of the identity of the first user, the user input, and the form factor, create and render on the display screen a first visualization;
  wherein the processor is configured to subsequent to the first time and at a second time:
    receive updated location information obtained from the sensors at the user electronic device, the updated location information indicating that the user electronic device has moved to a second geographic location that is different from the geographic location where the user electronic device was located at the first time;
    receive an indication of an identity of a second user, the second user being different from the first user;
    receive second user input identifying a second traversal by the second user of the graphical tree that has been displayed on the screen;
    based upon one or more of the updated location information, the indication of the identity of the second user, the second user input, and the form factor, create and render to the second user on the display screen a second visualization, the second visualization being different from the first visualization;
  wherein the processor is further configured to apply an overlay on top of the first visualization or the second visualization, the overlay including at least one control icon, and wherein the first user or the second user actuates the at least one control icon to change an operational aspect of the first industrial asset or the second industrial asset.

6. The apparatus of claim 5, wherein the model includes information that describes a relationship between the first industrial asset and the second industrial asset.

7. The apparatus of claim 5, wherein the user electronic device is a portable electronic device.

8. The apparatus of claim 5, wherein the screen is configured to allow a user input, the user input generating to change a parameter at a programmable logic controller at the industrial control machine.

* * * * *